Aug. 20, 1935.   R. J. HAUCK   2,011,897

PROTECTOR CAP

Filed May 4, 1934

INVENTOR
Richard J. Hauck
BY Harry W. Johnson
ATTORNEY

Patented Aug. 20, 1935

2,011,897

UNITED STATES PATENT OFFICE 2,011,897

PROTECTOR CAP

Richard J. Hauck, Milwaukee, Wis.

Application May 4, 1934, Serial No. 723,983

6 Claims. (Cl. 47—29)

My invention relates to a device used for protection and more particularly to a plant protector cap to be placed over seeds or small plants in the soil to protect them from the elements and to permit their growth.

An object of my invention is to provide a protector consisting of water proofed semi-transparent or transparent material such as wax paper or regenerated cellulose to protect the plant from frost and still furnish just the right amount of light to keep it growing.

Another object of my invention is to provide a device that will in addition to the protection afforded from the elements permit moistening of the soil under the cap without removing it from the ground to further assist in the development of the growing plant.

Another object of my invention is to provide a protector cap of semi-transparent material with a transparent element imbedded in its structure to permit observation of the growing process in the plant or seed in climates where the direct rays of the sun are detrimental to the plant, and a cap made of transparent material where the sun's rays are beneficial to the growing plant, both structures eliminating the necessity of removing the protector cap from the ground.

With the above and other objects which will be apparent as the description proceeds the invention consists of the following novel features and details of construction, to be hereinafter fully described, illustrated in the accompanying drawing and pointed out in the appended claims.

Figure 1:
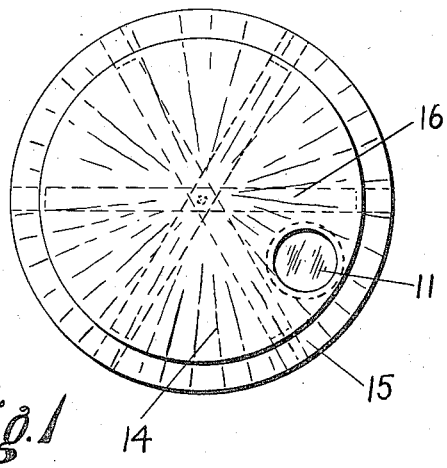
Fig. 1 is a top or plan view of the protector cap.
Figure 2:
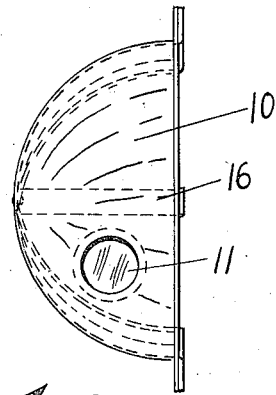
Fig. 2 is a side view of the protector cap.
Figure 3:
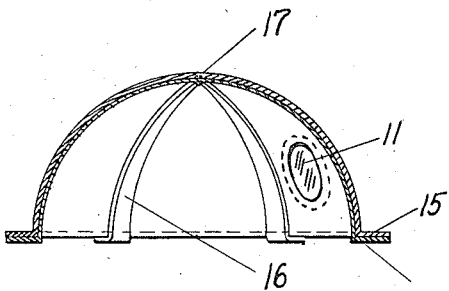
Fig. 3 is a cross sectional view of a plain semi-spherical shaped protector cap.
Figure 4:
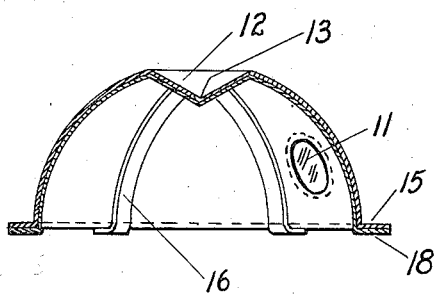
Fig. 4 is a cross sectional view of a plain semi-spherical shaped protector cap with a perforated invert conical reservoir at its apex.

Referring to the drawing in detail wherein like characters of reference denote corresponding parts the protector cap proper is indicated by character 10, the transparent element fastened adherently to the side of the semi-transparent cap 10 is indicated by the numeral 11, the invert cap 10 has an aperture 13 in its bottom. There are folds 14 produced by the material of the cap 10, and an outwardly extended flange 15 around the entire circumference of the cap 10.

The separate radial re-inforcing member consists of a series of supports 16 following the contour of the sides of the cap 10, fastened at their central point 17 and their lower ends 18 bent at right angle to conform with the flange 15 and permit the structure to be set on the surface of the soil.

In construction the cap 10 consists of a section of either transparent or semi-transparent material, blanked out of flat stock in either round, square, hexagon, octagon, or any other desired shape. This blanked out section can be made of transparent material or when semi-transparent material is used it may have an aperture of any desired shape or size punched out of it and a transparent element 11 adherently fastened to its inside edge. The entire blanked section is next formed into the desired shape, for example, semi-spherical as shown in the drawing with an outwardly extended flange 15 as shown, by means of forming dies, producing folds 14 placed at periodical positions along its sides, to permit its shape as well as strengthen its construction.

If desired an invert conical depression 12 pierced at 13, may be formed into the apex of the cap. This will act as a reservoir for manually applied or natural moisture, permitting the moisture to drip onto the soil around the seed or plant thereby assisting it in its growth. The progress of growth of the plant may be observed by the user through the transparent material, or the transparent element 11 in the semi-transparent cap without lifting or removing the cap, thereby eliminating the danger of a vacant space and a loss of time if the seed fails to germinate or the small plant fails to take root. This is not possible where a protector cap is constructed of opaque material and no provision is made for visibility or observance under the cap.

The separate radial re-inforcing member, made of wire, flat bands of steel or any material heavy enough to support the cap and keep it from being crushed by the material elements, is a separate part of the assembly and is designed to be placed over the plant or seed before the protector cap is placed in position. The supports are shaped to the contour of the walls of the cap, and the right angle bends in their ends, tend to permit setting the device on the level ground, thereby assuring a pre-determined height at all times.

The invention is susceptible to slight changes in its minor detail and the right is hereby reserved to make such necessary changes as properly fall within the scope of the appended claims.

Having thus described my invention what I claim and desire to secure by Letters Patent of the United States, is:

1. In a protecting cap consisting of a hollow structure of material pressed into shape with an outwardly extended flange along its circumference, a separate radial re-inforcing member with a series of supports conforming to the contour of the cap.

2. In a protecting cap constructed of transparent material pressed into shape with an outwardly extended flange along its circumference, a perforated funnel shaped apex and a separate radial re-inforcing member with a series of supports conforming to the contour of the cap.

3. A protecting cap consisting of a hollow structure of semi-transparent material pressed into shape with an outwardly extended flange along its circumference and a separate radial re-inforcing member with a series of supports conforming to the contour of the cap.

4. In a protecting cap consisting of a hollow structure of semi-transparent material pressed into shape with an outwardly extended flange along its circumference, a separate radial re-inforcing member with a series of supports conforming to the contour of the cap and one or more transparent elements imbedded into the side of the cap to allow visibility under same when the cap is in place.

5. In a protecting cap consisting of a hollow structure of semi-transparent material pressed into shape with an outwardly extended flange along its circumference, a perforated funnel shaped apex, a separate radial re-inforcing member with a series of supports conforming to the contour of the cap and one or more transparent elements imbedded into the side of the cap to allow visibility under same when the cap is in place.

6. In a protecting cap consisting of a hollow structure of semi-transparent material pressed into shape with an outwardly extended flange along its circumference, a perforated funnel shaped apex, and a separate radial re-inforcing member with a series of supports conforming with the contour of the cap.

RICHARD J. HAUCK.